United States Patent [19]

Koya et al.

[11] Patent Number: 5,420,950
[45] Date of Patent: May 30, 1995

[54] WIDE WAVELENGTH RANGE-OPTICAL FIBER COUPLER AND METHOD FOR THE PREPARATION THEREOF

[75] Inventors: Kazuo Koya; Tsuneo Mori, both of Gunma, Japan

[73] Assignee: Shin-Etsu Chemical Co., Ltd., Tokyo, Japan

[21] Appl. No.: 200,226

[22] Filed: Feb. 23, 1994

[30] Foreign Application Priority Data

Mar. 1, 1993 [JP] Japan .................. 5-039782

[51] Int. Cl.$^6$ .............................. G02B 6/26
[52] U.S. Cl. ........................ 385/43; 385/51
[58] Field of Search .............. 385/39, 42, 43, 46, 385/48, 50, 51

[56] References Cited

U.S. PATENT DOCUMENTS

| | | | |
|---|---|---|---|
| 5,011,251 | 4/1991 | Miller et al. | 385/43 |
| 5,066,087 | 11/1991 | Yamauchi et al. | 385/43 |
| 5,129,020 | 7/1992 | Shigematsu et al. | 385/43 |
| 5,295,211 | 3/1994 | Weidman | 385/43 |

*Primary Examiner*—John D. Lee
*Attorney, Agent, or Firm*—McAulay Fisher Nissen Goldberg & Kiel

[57] ABSTRACT

A wide wavelength range-coupler whose light-branching ratio shows low wavelength-dependency, which is provided with a well-shaped light-coupling portion and excellent optical properties and which can easily be connected to other optical fibers as well as a method for the production thereof are herein provided. The light-coupling portion 3 of the optical fiber coupler is formed by fusing and orientating a plurality of single mode optical fibers 1 and 2 partially arranged parallel to one another and these optical fibers 1 and 2 have cores 1a and 2a which are different from one another in diameter, but are substantially identical in the outer diameter of the clad and in the mode field diameter. Each single mode optical fiber as a material for the coupler has a core diameter and a mode field diameter which are correlated through a quadratic function and therefore, there can be selected two optical fibers 1 and 2 which are identical to one another in the mode field diameter, but differ in the core diameter.

8 Claims, 3 Drawing Sheets

WIDE WAVELENGTH RANGE-OPTICAL FIBER COUPLER AND METHOD FOR THE PREPARATION THEREOF

BACKGROUND OF THE INVENTION

The present invention relates to an optical fiber coupler having light-coupling, light-branching and light-coupling-branching abilities, in particular, an optical fiber coupler of a wide wavelength range whose light-branching ratio shows low wavelength-dependency, as well as a method for preparing the optical fiber coupler.

The optical fiber coupler is a device incorporated into an optical fiber communication system and serves to couple or branch light signals or serves to couple or branch light signals having different wavelengths. In the field of the optical fiber communication system, in particular, such a system which makes use of the so-called wavelength division multiplex-transmission system in which a plurality of optical signals having different wavelengths are transmitted through a single transmission line, there has been desired for the development of a optical fiber coupler of a wide wavelength range (hereunder also referred to as "wide wavelength range-optical fiber coupler") whose light-branching ratio has low wavelength-dependency.

Examples of conventional wide wavelength range-optical fiber couplers of this type include those disclosed in Japanese Patent Provisional Publication No. 2-236507 which are produced by arranging parallel to each other two single mode optical fibers whose clads have different outer diameters, fusing these fibers by heating with an oxyhydrogen burner, orientating the fused portion of the fibers while weakening the flame and swinging the burner to thus form a light-coupling portion; and those disclosed in Japanese Patent Provisional Publication No. 2-156210 which are produced by fusing and orientating a plurality of optical fibers having different core diameters to form a light-coupling portion.

In the optical coupler as disclosed in Japanese Patent Provisional Publication No. 2-236507, one of the optical fibers used has a clad diameter (outer diameter of the clad layer) smaller than that of the other optical fiber and accordingly, the mechanical strength of the resulting coupler is insufficient and this makes the handling thereof difficult. Since two optical fibers arranged parallel to one another and having different outer diameters are simultaneously heated, the fiber having a smaller diameter is first softened and causes deformation. This, correspondingly, makes the formation of a well-shaped light-coupling portion difficult. Therefore, this technique does not ensure the production of a wide wavelength region-optical fiber coupler having excellent optical properties. Moreover, one lead portion of the resulting optical fiber coupler has an outer diameter different from that of the usual optical fiber. This makes the connection of the coupler with other optical fibers difficult and, in turn, leads to an increase in the connection loss.

On the other hand, the light-coupling portion formed from optical fibers having different core diameters as disclosed in Japanese Patent Provisional Publication No. 2-156210 likewise suffers from a problem in that an increase in the connection loss would be observed when the optical fiber coupler is connected to another optical fiber due to differences in the cut-off wavelength and in the mode field diameter between the optical fibers used as starting materials for the formation of the light-coupling portion.

SUMMARY OF THE INVENTION

The present invention has been developed to solve the foregoing problems associated with the conventional optical fiber couplers and, accordingly, an object of the present invention is to provide a wide wavelength range-optical fiber coupler provided with a well-shaped light-coupling portion and having excellent optical properties and which can optically be connected to another optical fiber with ease as well as a method for producing the optical fiber coupler.

The wide wavelength range-optical fiber coupler provided with a light-coupling portion formed by fusing and orientating a plurality of single mode optical fibers which are partially arranged parallel to each other, wherein these optical fibers have different core diameters, but these optical fibers are substantially identical in the outer diameter of the clad and in the mode field diameter.

Specifically, the optical fiber coupler according to the present invention comprises, for instance, two starting optical fibers, one of these optical fibers has a core diameter falling within the range wherein the mode field diameter thereof increases as the core diameter increases, while the other optical fiber has a core diameter falling within the range in which the mode field diameter thereof increases as the core diameter decreases and wherein the core diameter of these two optical fibers differ from one another, while these two optical fibers are identical to one another in the mode field diameter.

The term "substantially identical in the outer diameter of the clad and in the mode field diameter" herein used means the fact that the outer diameter of the clad and the mode field diameter each falls within each corresponding standard range for the single mode optical fiber used in the usual light-transmission. For instance, this requirement is satisfied if the outer diameter of the clad and the mode field diameter for the optical fibers used in the invention fall within the ranges: 125 $\mu$m$\pm$3 $\mu$m and 10 $\mu$m$\pm$1 $\mu$m, respectively.

According to another aspect of the present invention, there is provided a method for producing a wide wavelength range-optical fiber coupler which permits the achievement of the foregoing object comprises the steps of partially arranging, parallel to one another, a plurality of single mode optical fibers which have different core diameters, but are substantially identical to one another in the outer diameter of the clad and in the mode field diameter; and fusing and orientating the portion of the optical fibers arranged parallel to each other by holding the fibers at positions situating before and behind the portion thereof arranged parallel and drawing the portion with heating to thus form a light-coupling portion.

DETAILED EXPLANATION OF THE INVENTION

The wide wavelength range-optical fiber coupler according to the present invention comprises a plurality of single mode optical fibers, for instance, two single mode optical fibers 1 and 2 (see FIG. 1) having different core diameters 1a and 2a and accordingly, functions as a coupler of a wide wavelength range whose light-branching ratio shows low wavelength-dependency. Nevertheless, these single mode optical fibers 1 and 2 are identical in the outer clad diameter. Therefore, the optical fibers 1 and 2 are equally heated, fused and orientated during the fusing step under heating in the production of the optical fiber coupler of the invention and this leads to the formation of a well-shaped light-coupling portion. Thus, the outer diameter of the optical fibers 1 and 2 at the lead parts of the resulting optical fiber coupler of a wide wavelength range can be set at the level identical or similar to that of the usual optical fiber and accordingly, the optical coupler can easily be connected to other optical fibers. Moreover, the mode field diameters of these optical fibers 1 and 2 are substantially identical to one another and thus any connection loss is not observed at all even when the optical fiber coupler is connected to other optical fibers.

The present invention will hereunder be explained with reference to the following Embodiments, but the present invention is not restricted to these specific Embodiments.

Figure 1:
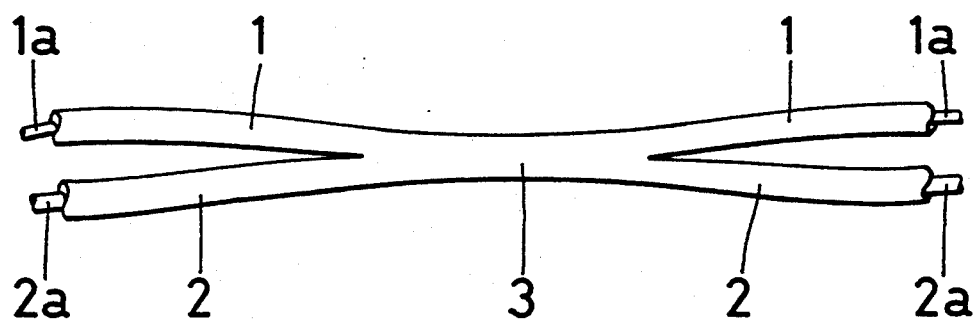
FIG. 1 is an enlarged side view showing an embodiment of the wide wavelength range-optical fiber coupler according to the present invention.
Figure 3:
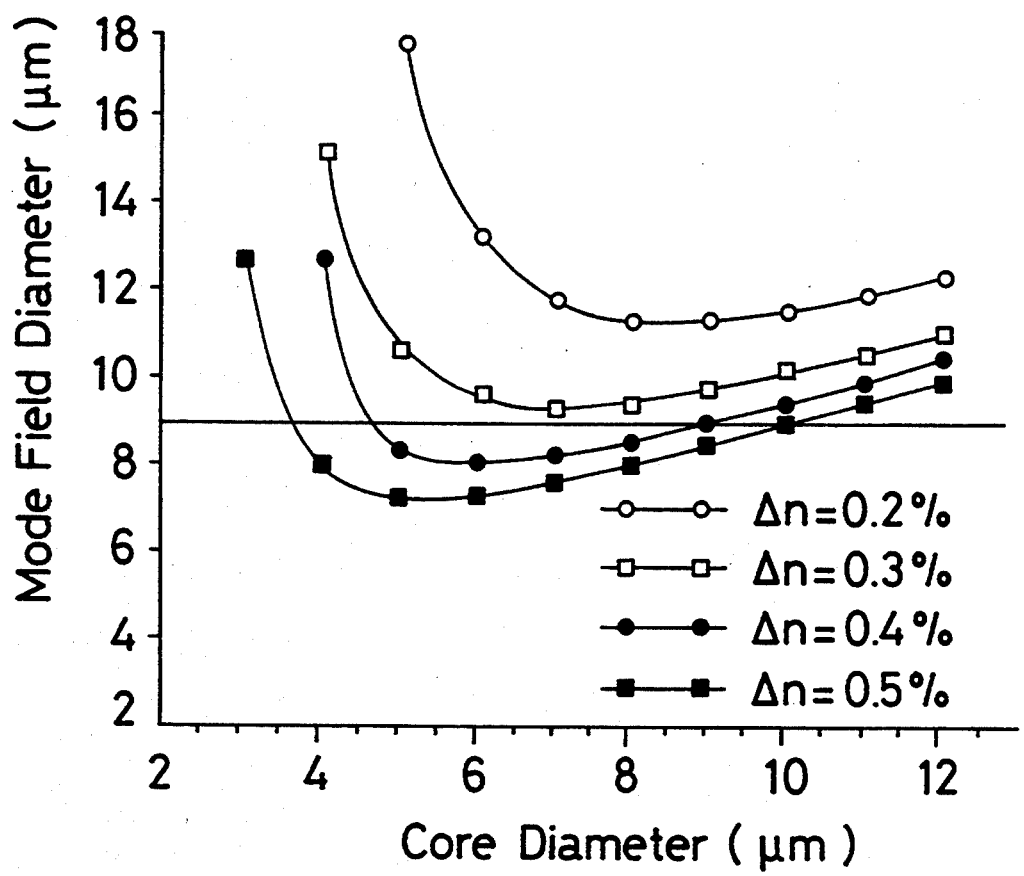
FIG. 3 is a diagram showing the relation between the core diameter and the mode field diameter of a single mode optical fiber.

FIG. 1 is an enlarged side view showing an embodiment of the wide wavelength range-optical fiber coupler according to the present invention. As seen from FIG. 1, two single mode optical fibers 1 and 2 arranged parallel to one another are partially fused and orientated to form a light-coupling portion 3. This wide wavelength range-optical fiber coupler is produced as follows:

First of all, two single mode optical fibers are selected, which are starting materials for the production of the optical fiber coupler of a wide wavelength range. The relation between the core diameter and the mode field diameter of a single mode optical fiber having a refractive index difference $\Delta n$ between the refractive indexes of the core and the clad thereof is expressed by a quadratic function as shown in FIG. 3. Therefore, there are two core diameters which correspond to a single mode field diameter. The core diameters 1a and 2a of these single mode optical fibers 1 and 2 can be selected on the basis of such a relation.

More specifically, the outer diameters of the single mode optical fibers 1 and 2 are both set at 125 $\mu m \pm 3$ $\mu m$ which is in conformity with the usual standard level. In addition, the mode field diameters of these optical fibers 1 and 2 are both set at 9 $\mu m$. The refractive index difference $\Delta n$ between the refractive indexes of the core 1a and the clad of the optical fiber 1 is 0.4% and thus the single mode optical fiber 2 is selected such that it has the same refractive index difference. Two single mode optical fibers which have the same refractive index difference $\Delta n$ of 0.4% and the same mode field diameter of 9 $\mu m$ are those having core diameters of 4.7 $\mu m$ and 9 $\mu m$ respectively as will be apparent from FIG. 3. Thus, the diameter of the core 1a of the optical fiber 1 is set at 4.7 $\mu m$, while that of the core 2a of the optical fiber 2 is set at 9 $\mu m$. More specifically, the single mode optical fiber 2 is selected in such a manner that the diameter of the core 2a is greater than that of the core 1a of the optical fiber 1 and that the outer clad diameter and the mode field diameter of the optical fiber 2 are identical to those for the optical fiber 1.

Figure 2:
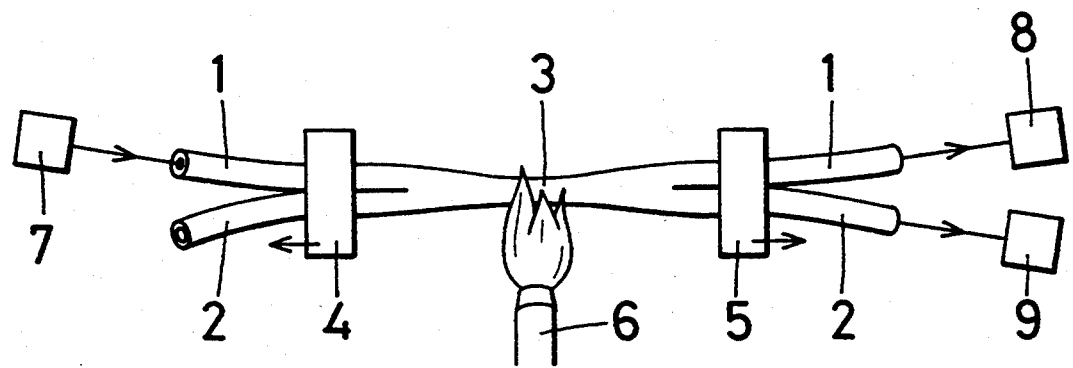
FIG. 2 is a diagram for explaining a step in the method for producing the wide wavelength range-optical fiber coupler according to the present invention.

These two single mode optical fibers 1 and 2 selected in this way are partially arranged parallel to one another as shown in FIG. 2 and fixed by holding two positions of these fibers situating before and behind the portion arranged parallel with clamps 4 and 5. These clamps 4 and 5 are fitted to moving tables (not shown) and the moving tables are connected to a driving source. A semiconductor laser light source 7 capable of emitting a laser beam having a wavelength of 1.3 $\mu m$ is connected to the single mode optical fiber 1 on its light-incident side, a photo receptor 8 is connected to the optical fiber 1 on the light-outputting side and a photo receptor 9 is likewise connected to the single mode optical fiber 2 on the light-outputting side. The portions of the optical fibers 1 and 2 arranged parallel to one another are heated by the flame of a microburner 6 to which propane gas and oxygen gas are supplied and simultaneously the optical fibers 1 and 2 are drawn along the longitudinal axis thereof by moving the clamps 4 and 5 towards opposite directions through the operation of the moving tables. Thus, the portions of the optical fibers 1 and 2 heated are fused together and orientated to give a light-coupling portion 3. These operations are performed while a laser beam from the semiconductor laser light source 7 is incident upon the light-incident end of the optical fiber 1 to determine the light intensity inputted to the photo receptor 8 through the optical fiber 1, the light-coupling portion 3 and optical fiber 1 and that inputted to the photo receptor 9 through the optical fiber 1, the light-coupling portion 3 and the optical fiber 2. The heating and drawing operations are interrupted at an instance when the light intensity inputted to the photo receptor 8 is equal to that inputted to the photo receptor 9, i.e., when the light-branching ratio of the wide wavelength range-optical fiber coupler in the course of the orientation reaches 50%.

Figure 4:
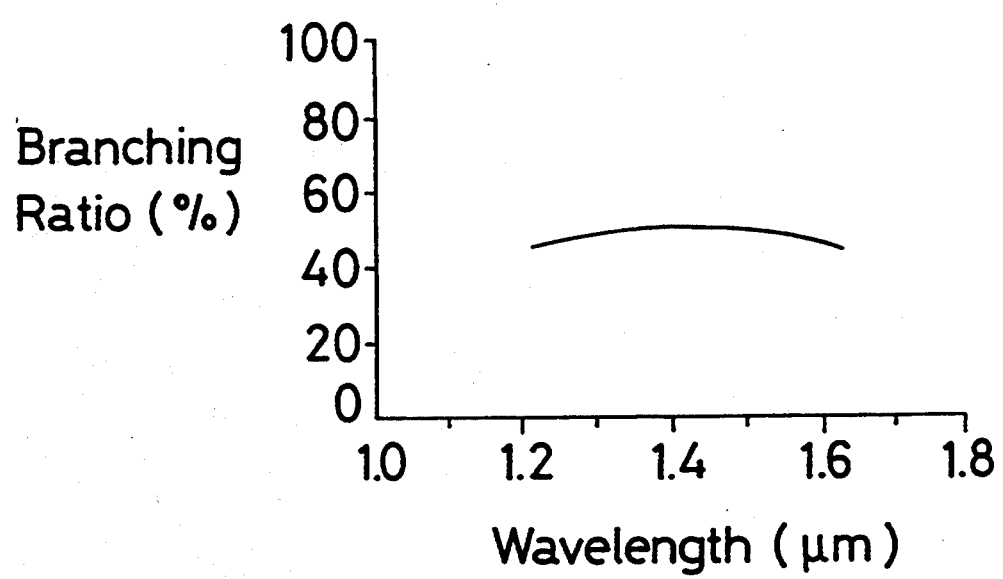
FIG. 4 is a graph on which the measured branching ratios of the wide wavelength range-optical fiber coupler according to the present invention are plotted as a function of wavelengths of light incident upon the coupler.

The wide wavelength range-optical fiber coupler thus produced was inspected for the wavelength-dependency through determination of variations in the light-branching ratio depending on the wavelengths incident upon the coupler. As a result, it was found that the light-branching ratio of the coupler was approximately constant over a wavelength range of from 1.30 $\mu m$ to 1.55 $\mu m$ (generally used wavelength range) as seen from FIG. 4, i.e., the optical fiber coupler thus produced showed quite low wavelength-dependency. Moreover, this optical fiber coupler was connected to a single mode optical fiber for transmitting optical signals and the connection loss of the resulting assembly was determined and found to be not more than 0.1 dB. This result clearly indicates that the resulting wide wavelength range-optical fiber coupler causes almost no connection loss when connected to another optical fiber.

As has been explained above in detail, the wide wavelength range-optical fiber coupler according to the present invention is produced from a plurality of single mode optical fibers having different core diameters and accordingly, the light-branching ratio of the coupler shows very low wavelength-dependency. Since the outer diameters of these single mode optical fibers are identical to one another, a well-shaped light-coupling portion can be formed, the coupler has excellent optical properties and can easily be connected to other optical fibers. In addition, the mode field diameters of these single mode optical fibers used are likewise substantially identical to one another and, therefore, the coupler of the present invention causes almost no connection loss when it is connected to other optical fibers.

Moreover, the method for producing the wide wavelength range-optical fiber coupler according to the present invention does not require the use of any process for reducing the diameters of a plurality of single mode optical fibers as materials for the coupler of the invention and thus the production process does not accompany any reduction of the mechanical strength of the starting optical fibers. In addition, the outer diameters of these plurality of single mode optical fibers are identical to one another and accordingly, these optical fibers do not cause any local softening and deformation during fusing with heating and thus a well shaped light-coupling portion can be formed.

What is claimed is:

1. An optical fiber coupler of a wide wavelength range which comprises a light-coupling portion formed by fusing and orientating a plurality of single mode optical fibers partially arranged parallel to one another, the coupler comprising two optical fibers, one of which has a core diameter falling within the range in which the mode field diameter thereof increases as the core diameter increases, while the other of which has a core diameter falling within the range in which the mode field diameter thereof increases as the core diameter decreases and wherein the core diameters of the optical fibers differ from each other and the mode field diameters are identical.

2. The optical fiber coupler of claim 1 wherein the two optical fibers have an identical outer clad diameter.

3. The optical fiber coupler of claim 2 wherein the identical outer clad diameter is around 125 μm.

4. The optical fiber coupler of claim 1 wherein the wavelength of the light-branching thereof ranges from 1.30 to 1.55 μm.

5. A method for producing a wide wavelength range-optical fiber coupler comprising the steps of partially arranging, parallel to one another, at least two single mode optical fibers, which have different core diameters, but substantially identical outer, clad, and mode field diameters and one of which has a core diameter falling within the range in which the mode field diameter thereof increases as the core diameter increases, while the other of which has a core diameter falling within the range in which the mode field diameter thereof increases as the core diameter decreases, and fusing and orientating the parallel portion of the optical fibers by holding the fibers at positions situating before and behind the parallel portion and drawing the parallel portion with heating to thus form a light-coupling portion.

6. The method of claim 5 wherein the two optical fibers have an identical outer clad diameter.

7. The method of claim 6 wherein the identical outer clad diameter is around 125 μm.

8. The method of claim 5 wherein the wavelength of the light-branching thereof ranges from 1.30 to 1.55 μm.

* * * * *